No. 753,328. PATENTED MAR. 1, 1904.
T. STITES.
MANTLE SUPPORT.
APPLICATION FILED APR. 4, 1902.
NO MODEL.

Inventor
Townsend Stites
By
Augustus B. Stoughton
Attorney

Witnesses

No. 753,328. Patented March 1, 1904.

UNITED STATES PATENT OFFICE.

TOWNSEND STITES, OF PHILADELPHIA, PENNSYLVANIA, ASSIGNOR TO WELSBACH LIGHT COMPANY, OF GLOUCESTER CITY, NEW JERSEY, A CORPORATION OF NEW JERSEY.

MANTLE-SUPPORT.

SPECIFICATION forming part of Letters Patent No. 753,328, dated March 1, 1904.

Application filed April 4, 1902. Serial No. 101,381. (No model.)

*To all whom it may concern:*

Be it known that I, TOWNSEND STITES, a citizen of the United States, residing at Philadelphia, in the county of Philadelphia and State of Pennsylvania, have invented certain new and useful Improvements in Mantle-Supports, of which the following is a specification.

One of the problems confronting mantle manufacturers in the production of a mantle which shall be both cheap and at the same time embody as many improvements as its price justifies (a leading one of which improvements is the sale to the customer of a mantle mounted on a carrier such as the now well-known Welsbach carrier) is the holding of a mantle on the side support without using the expensive method of sewing the head with platinum and winding the platinum wires on the support. The usual form of cheap mantles is to sew the head with asbestos and then form a bale of the same material. Heretofore this method has precluded to any large extent the production of an asbestos-sewed mantle with a bale and mounted on a carrier, due to its liability to misadjustment in transit. To allow of this method of sewing and at the same time maintain the position of the mantle on the carrier during the vicissitudes of travel, some modification of the ordinary hook is necessary.

It is the object of this invention to provide such a hook whereby the bale will be held positively upon the carrier without departing from the present mode of manufacture of the mantle.

A further object of this invention is to prevent another mantle being attached to the old carrier when the original mantle is damaged or destroyed.

The nature, characteristic features, and scope of my invention will be more fully understood from the following description, taken in connection with the accompanying drawings, forming part hereof, and in which—

Figure 1:
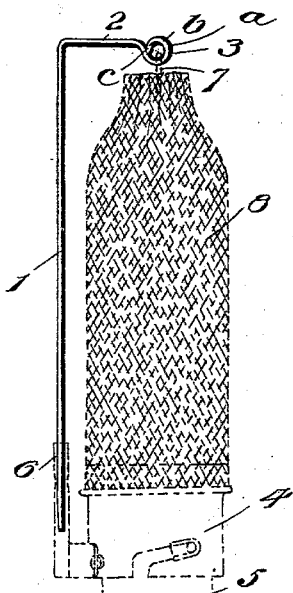
Figure 2:
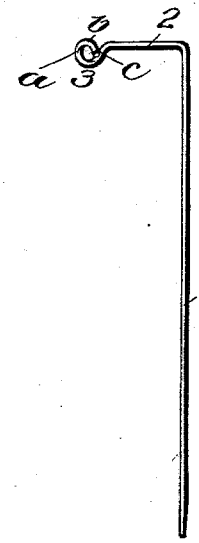
Figure 3:
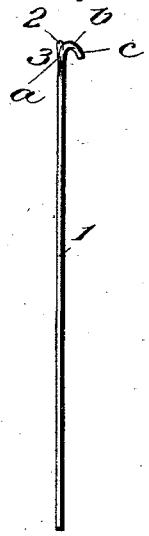
Figure 4:

Figure 1 is an elevational view of a mantle-carrier embodying the invention with a mantle applied thereto. Fig. 2 is a view of the mantle-support seen from the opposite side. Fig. 3 is a front view, and Fig. 4 is a top or plan view, of the support.

My improved mantle-support consists of a wire having the shank 1 and transverse portion 2, which latter is curved upon itself to provide a hook 3 of unusual shape, as clearly shown in the drawings. The peculiar shape of this hook is obtained by curving said transverse portion downwardly near its outer end, as usual, and then bending it upwardly and backwardly, as at *a b*, and finally bending it downwardly, as at *c*, at an angle to the transverse portion 2 to constitute a guard.

4 is a collar which is adapted to the burner-head 5. The collar is provided with a socket or holder 6, into which the side support 1 is inserted.

In packing the outfit for shipment the bale 7 of the mantle 8 is slipped over the hook 3, and the support 1 is then inserted into its socket 6, and the latter two are secured together, for example, by pinching. The length of the mantle exceeds the distance between the top of the collar and the neck of the hook, and inasmuch as the collar 4 extends into the base of the mantle, as indicated by the dotted lines, it will be impossible for the bale 7 to detach itself from the arched or overhanging hook 3, owing to the peculiar formation of the latter, and it will also be impossible to remove the mantle without destroying it or its support.

It will be obvious to those skilled in the art to which the invention relates that modifications may be made in details without departing from the spirit and scope of the same. Hence I do not limit myself to the precise construction and arrangement of parts hereinabove set forth and illustrated in the accompanying drawings; but,

Having thus described the nature and objects of the invention, what I claim as new, and desire to secure by Letters Patent, is—

1. A mantle-support consisting of a shank having a transverse portion curved downwardly and upwardly and backwardly to constitute one turn of a spiral and having its end curved downwardly and laterally to constitute a guard, substantially as described.

2. In combination a collar provided with a socket, a side support tightly secured to the socket and provided with a transverse portion curved downwardly and upwardly and backwardly to constitute one turn of a spiral and having its end curved downwardly and laterally to constitute a guard, and a mantle provided with a bale engaged by said spiral turn, the height of the mantle exceeding the distance between the top of the collar and the bottom of the spiral turn, substantially as described.

In testimony whereof I have hereunto signed my name.

TOWNSEND STITES.

In presence of—
W. J. JACKSON,
FRANK T. KALAS,